US009405555B2

(12) United States Patent
Livshits et al.

(10) Patent No.: US 9,405,555 B2
(45) Date of Patent: Aug. 2, 2016

(54) AUTOMATED CODE SPLITTING AND PRE-FETCHING FOR IMPROVING RESPONSIVENESS OF BROWSER-BASED APPLICATIONS

(75) Inventors: Benjamin Livshits, Kirkland, WA (US); Emre Kiciman, Seattle, WA (US); Chen Ding, Rochester, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1789 days.

(21) Appl. No.: 12/125,931

(22) Filed: May 23, 2008

(65) Prior Publication Data
US 2009/0292791 A1 Nov. 26, 2009

(51) Int. Cl.
G06F 9/44 (2006.01)
G06F 9/54 (2006.01)

(52) U.S. Cl.
CPC .............. *G06F 9/4443* (2013.01); *G06F 9/547* (2013.01)

(58) Field of Classification Search
CPC ....................................................... G06F 8/451
USPC .................................. 717/172, 177; 709/205
See application file for complete search history.

(56) References Cited

U.S. PATENT DOCUMENTS

| | | | |
|---|---|---|---|
| 6,055,569 A | 4/2000 | O'Brien et al. | |
| 6,711,619 B1 | 3/2004 | Chandramohan et al. | |
| 6,983,463 B1 * | 1/2006 | Hunt ............................. | 719/316 |
| 7,225,264 B2 | 5/2007 | Croman et al. | |
| 7,231,644 B2 | 6/2007 | Kieffer | |
| 2002/0078142 A1 * | 6/2002 | Moore et al. ................... | 709/203 |
| 2003/0033448 A1 * | 2/2003 | Kieffer ........................... | 709/331 |
| 2003/0051236 A1 * | 3/2003 | Pace et al. ...................... | 717/177 |
| 2006/0259592 A1 | 11/2006 | Angeline | |
| 2007/0101258 A1 | 5/2007 | Xu et al. | |

(Continued)

OTHER PUBLICATIONS

Fan Yang, Nitin Gupta, Nicholas Gerner, Xin Qi, Alan Demers, Johannes Gehrke, and Jayavel Shanmugasundaram. 2007. A unified platform for data driven web applications with automatic client-server partitioning. In Proceedings of the 16th international conference on World Wide Web (WWW '07). ACM, New York, NY, USA, 341-350.*

(Continued)

*Primary Examiner* — Matthew Brophy
(74) *Attorney, Agent, or Firm* — Alin Corie; Cassandra T. Swain; Micky Minhas

(57) ABSTRACT

A "code splitting tool" provides various techniques for automatically analyzing and rewriting existing browser-based applications to introduce dynamic code loading into those applications thereby improving perceived application responsiveness. Structural elements of application code (including functions, classes, etc.) are broken into small "stubs" with corresponding bodies. Rewritten applications then initially transfer only the portion of the code (including some combination of stubs and bodies) to the client as necessary for initial application execution. Additional stubs and/or bodies are then transferred either on-demand at runtime or in the background. Automated code rewriting proceeds without requiring any application-specific knowledge or changes to existing code prior to code rewriting. Further, the code splitting tool can tailor code rewriting to specific computing devices (computers, PDA's, cell phones, etc.), specific network conditions, and/or specific users, through an automated training process that creates clusters that control code downloads to optimize perceived application responsiveness.

20 Claims, 4 Drawing Sheets

(56) References Cited

U.S. PATENT DOCUMENTS

2007/0106946 A1    5/2007    Goetz et al.
2007/0186182 A1    8/2007    Schiller

OTHER PUBLICATIONS

Lo, H. Y., "M-mail: A case study of dynamic application partitioning in mobile computing," Master's thesis, Dept. of Computer Science, University of Waterloo, May 1997.*
Schmid, M.; Thoss, M.; Terrain, T.; Kroeger, R.; , "A Generic Application-Oriented Performance Instrumentation for Multi-Tier Environments," Integrated Network Management, 2007. IM '07. 10th IFIP/IEEE International Symposium on , vol., no., pp. 304-313, May 21, 2007—Yearly 25 2007.*
Chong, Jed Liu, Andrew C. Myers, Xin Qi, K. Vikram, Lantian Zheng, and Xin Zheng. 2007. Secure web applications via automatic partitioning. In Proceedings of twenty-first ACM SIGOPS symposium on Operating systems principles (SOSP '07). ACM, New York, NY, USA, 31-44.*
Calder, Brad, Chandra Krintz, and Urs Hölzle. "Reducing transfer delay using Java class file splitting and prefetching." ACM Sigplan Notices. vol. 34. No. 10. ACM, 1999.*
(Doloto: Code Splitting for Network-Bound Web 2.0 Applications. Benjamin Livshits and Emre Kiciman. Microsoft Technical Report. Dec. 2007. Available at http://research.microsoft.com/apps/pubs/default.aspx?id=70518>).*
Code Splitting for Network Bound Web 2.0 Applications. Benjamin Livshits and Chen Ding Microsoft Research Technical Report, Aug. 2007 available at <http://research.microsoft.com/en-us/um/people/livshits/papers/tr/splitting_tr.pdf>.*
"Modular JSON/On-Demand JavaScript interface", http://www.glennjones.net/Post/808/ModularJSONOn-DemandJavaScriptinterface.htm.
"Reducing Startup Latency in Web and Desktop Applications", http://www.usenix.org/publications/library/proceedings/usenix-nt99/full_papers/lee/lee_html/paper3.html.
"Is AJAX the new Web?", http://www.wwwcoder.com/tabid/68/type/art/parentid/263/site/6174/default.aspx.
"Client-Side Performance Optimization of Ajax Applications", http://piecesofrakesh.blogspot.com/2007/10/client-side-performance-optimization-of.html.
"Dojo, the JavaScript toolkit", http://dojotoolkit.org.
Michael Franz, "Dynamic linking of software components", IEEE, Computer, Mar. 1997, vol. 30, pp. 74-81.
"Google Web toolkit", http://code.google.com/webtoolkit.
Kiciman, et al., "AjaxScope: a platform for remotely monitoring the client-side behavior of Web 2.0 applications", In Proceedings of Symposium on Operating Systems Principles, Oct. 2007, 14 pages.
Krintz, et al., "Reducing transfer delay using Java class file splitting and prefetching", In proceedings of 14th Annual ACM SIGPLAN Conference on Object-Oriented Programming Systems, Languages, and Applications (OOPSLA), Nov. 1999, pp. 276-291.
Liang, et al., "Dynamic class loading in the Java virtual machine", In Proceedings of the Conference on Object-Oriented Programming, Systems, Languages, and Applications, 1998, pp. 36-44.
Myers, et al., "MapJAX: Data structure abstractions for asynchronous Web applications", In Proceedings of the Usenix Technical Conference, Jun. 2007, 14 pages.
Pacifici, et al., "Performance management for cluster based Web services", Technical report, IBM Research, May 13, 2003, pp. 1-17.
Horrigan, et al., "Pew Internet and American Project", Home broadband adoption, PEW/ Internet (Pew Internet & American Life Project), 2007, pp. 1-14.
Reis, et al., "BrowserShield: Vulnerability-driven filtering of dynamic HTML", In Proc. OSDI, 2006, 14 pages.
Steve Souders, "High performance Web sites", 2007, 61 pages, Presentation available at: "www.stevesouders.com/docs/fowa.ppt".
Steve Souders, "High Performance Web Sites: Essential Knowledge for Front-End Engineers", O'Reilly Media, Inc., 2007, 17 pages.
"Squid Web proxy cache", Squid developers, http://www.squid-cache.org.
Stewart, et al., "Performance modeling and system management for multi-component online services", In USENIX Symposium on Networked Systems Design and Implementation, 2005, 14 pages.
Tang, et al., "A scalable application placement controller enterprise data centers", in WWW 2007: Track: Performance and Scalability, May 2007, pp. 331-340.
Tip, et al., "Extracting library-based Java applications", Communications of the ACM, vol. 46, Issue 8, Aug. 2003, pp. 35-40.
Tip, et al., "Practical extraction techniques for Java", ACM Transactions of Programming Languages and Systems, vol. 24, Issue 6, 2002, pp. 625-666.
"XMLHttpRequest", Wikipedia, http://en.wikipedia.org/wiki/XMLHttpRequest.
Yu, et al., "JavaScript instrumentation for browser security", In Proceedings of the Conference on the Principle of Programming Languages, Jan. 2007, pp. 237-249.
Jensen, et al., "Security and dynamic class loading in Java: A formalization", In Proceedings of the International Conference on Computer Languages, 1998, 12 pages.
"Fiddler: Web debugging proxy", http://www.fiddlertool.com/fiddler/.
"RabbIT proxy for a faster Web", http://rabbit-proxy.sourceforge.net/.

* cited by examiner

AUTOMATED CODE SPLITTING AND PRE-FETCHING FOR IMPROVING RESPONSIVENESS OF BROWSER-BASED APPLICATIONS

BACKGROUND

1. Technical Field

A code splitting tool provides various techniques for automatically analyzing and rewriting code of existing applications to reduce initial download sizes in order to improve initial application start times and the responsiveness of user interaction across high-latency networks such as, for example, the Internet or other networks for mobile devices such as cell phones and the like.

2. Related Art

Conventional network-based applications, such as browser-based email programs, interactive mapping services, social networking web sites, etc., typically use a combination of Dynamic HTML, JavaScript, and other Web browser technologies commonly referred to as "AJAX" to push page generation, content manipulation, and other types of execution to the client's browser. A few well known examples of these types applications include Gmail™, Live Maps™, RedFin™, MySpace.com®, NetFlix®, etc.

One advantage of pushing execution to the client is that it tends to reduce overall server load since clients generate their own web pages by locally executing application code transmitted to the client by the server. Another advantage of this type client-based execution is that it tends to improve the latency of user interactions in network-bound applications since local code execution is often faster than communication across the network.

Unfortunately, initial application execution must generally wait until the entire code base has been downloaded from the server to the client. Further, as the sophistication and feature sets of these network-based applications grow, downloading their client-side code is increasingly becoming a bottleneck in both their initial startup time and subsequent application interactions. Given the importance of performance and "instant gratification" demanded by users in the adoption of such applications, maintaining and improving the application responsiveness, despite increased code size is of primary concern. Unfortunately, as applications become more complex and feature rich, the shift of application execution from a back-end server to the client often dramatically increases the amount of code that must be downloaded to the. The result is that perceived responsiveness of the application is degraded.

For example, over a typical 802.11b wireless connection, the simple act of using a web browser for opening an email in a Hotmail® inbox can take approximately 24 seconds on a first visit (with a clean browser cache). Further, even after static resources and code have been cached, this action takes about 11 seconds. Users on dial-up, cell phone, or slow international networks generally see much worse latencies, with large applications becoming virtually unusable. Live Maps™, for example, takes over 3 minutes to download on a second (cached) visit over a 56k modem.

In addition to increased application responsiveness, reducing the amount of code needed for the application to run has the benefit of reducing the overall download size. This is very important in mobile networking and in some international contexts, where the cost of network connectivity is often measured as a cost-per-byte instead of as a flat rate.

One solution to these types of problems, generally referred to as "dynamic code loading," is to structure the application code such that only the minimal amount of code necessary for initialization is transferred in the critical path of application loading. The rest of the application's code is then dynamically loaded either on-demand or in the background. Many modern browsers support this type of explicit on-demand loading of JavaScript code. However, manually designing a Web application to correctly support dynamic loading of application code is a challenging and error-prone process that must be done at the time that such applications are initially coded. In particular, web developers have to track the dependencies between user actions, application functionality, and code components. Further, this type of manual code design requires scheduling background code downloads at appropriate times to avoid stalling a user's interactions. Finally, developers have to maintain and update the resultant code base as the application code and typical user workloads and behaviors evolve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a code splitting tool, as described herein, provides various techniques for automatically analyzing and rewriting code of existing applications to reduce initial download sizes for improving initial application start times and user interaction with browser-based applications across high-latency networks. As such, the code splitting tool provides a means of improving the perceived responsiveness of large and complex distributed network applications (sometimes referred to as "Web" or "Web 2.0" applications) within the end-user's browser. Note that these types of applications are typically executed within browser type applications on PC-type computers, handheld devices such as PDA's or cell phones, other computing devices, etc.

In other words, the code splitting tool provides various techniques for automatically rewriting applications to introduce dynamic code loading into those applications whether or not they were originally designed to implement dynamic code loading. Further, in various embodiments, the code splitting tool tailors application code rewriting to any combination of specific computing devices (computers, PDA's, cell phones, etc.), specific network conditions, and/or specific users, through an automated training process that evaluates application use in real world or simulated execution conditions. Consequently, in various embodiments, the code splitting tool is effective for selectively rewriting application code to optimize perceived responsiveness taking parameters such as network conditions, computing devices, and even individual users into account.

More specifically, in various embodiments, the code splitting tool provides a code rewriting strategy that automatically breaks structural code units of application code (including functions, methods, procedures, classes, modules, libraries, variables, data, etc. written in scripting languages such as JavaScript™ or Visual Basic™ etc., or compiled applications written in languages such as C#, C++, Java, etc.) into small "stubs" with corresponding "bodies." Stubs provide the hooks and functionality to call, use or reference a structural code unit. Bodies provide the implementation of the structural code unit. The rewritten code is then maintained on the server. After processing by the code splitting tool, applications will initially transfer only the portion of code (including some combination of stubs and bodies) to the client as necessary for initial application execution. Additional stubs and/or bodies are then transferred from the server to the client either on-demand at runtime or in the background for local caching depending upon available bandwidth or other trigger conditions such as application feature access times, network characteristics, client browser type, and/or client device type.

Furthermore, in various embodiments, the code splitting tool uses various training techniques to enhance code optimization by collecting application data, network performance characteristics, device capabilities, and/or user specific data to automatically group structural code units into "clusters" roughly corresponding to individual high-level application features based on feature access times. The code splitting tool then rewrites the application code in a way that controls which clusters are downloaded to the client together, and also when those clusters are downloaded, to best improve perceived application responsiveness.

In view of the above summary, it is clear that the code splitting tool described herein provides various unique techniques for automatically analyzing and rewriting code of existing applications to introduce dynamic code loading into those applications. This automated introduction of dynamic code loading serves to reduce initial download sizes for improving initial application start times and user interaction across high-latency networks. In addition to the just described benefits, other advantages of the code splitting tool will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
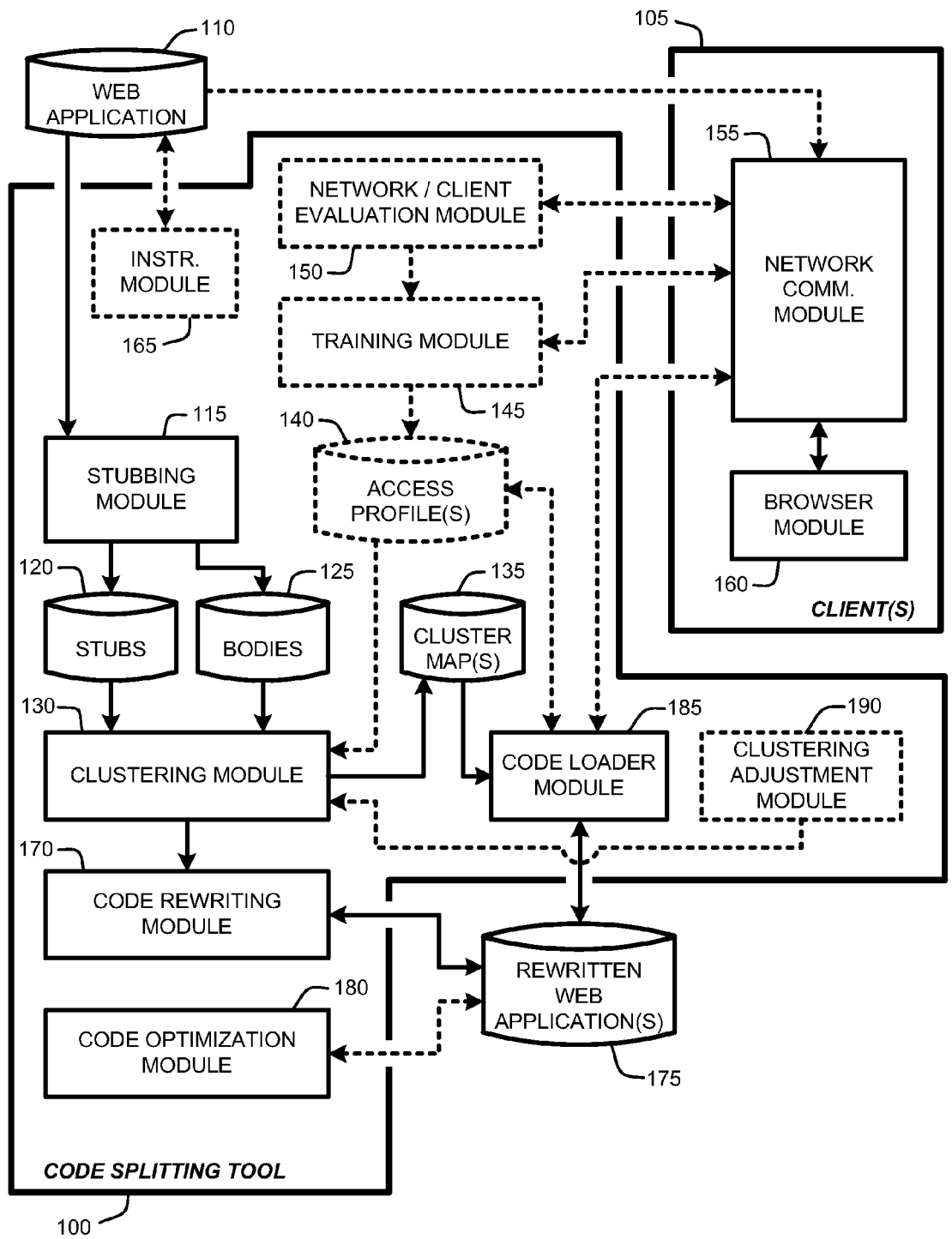
FIG. 1 provides an exemplary architectural flow diagram that illustrates program modules for implementing various embodiments of a code splitting tool, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

Web applications are typically executed within browser type applications on PC-type computers, handheld devices such as PDA's or cell phones, or other computing devices. In general, a "code splitting tool," as described herein, provides various techniques for automatically analyzing and rewriting existing distributed network applications (sometimes referred to as "Web" or "Web 2.0" applications) to introduce dynamic code loading into those applications. In other words, the code splitting tool provides a deployment-time tool that rewrites existing Web application code without changing the appearance or functionality of those applications from a user perspective. The automatically introduced dynamic code loading reduces initial download sizes for improving initial application start times and the responsiveness of user interaction for browser-based applications across high-latency networks. The result is an improvement in perceived application responsiveness for end users.

One of the advantageous features of the rewriting capabilities of the code splitting tool is that these capabilities are applicable to existing application code without requiring any application-specific knowledge or any changes to existing code prior to the automated rewriting provided by the code splitting tool. Further, the improvement in perceived application responsiveness provided by the code splitting tool is particularly pronounced for slower, but increasingly common and important types of connections, such as wireless and mobile connections. In particular, in wireless and mobile connections, the execution penalty (i.e., download size and delay time to initial application execution) is especially high if the entire code base must be transferred to the client prior to execution, especially if the user is paying for their connectivity per byte transferred and/or per time connected.

More specifically, in various embodiments, the code splitting tool provides a code rewriting strategy that automatically decomposes structural code units of application code (including functions, methods, procedures, classes, modules, libraries, variables, data, etc. written in scripting languages such as JavaScript, etc., or compiled applications written in languages such as C#, C++, Java, etc.) into small "stubs" with corresponding "bodies." Stubs provide the hooks and functionality to call, use or reference a structural code unit. Bodies provide the implementation of the structural code unit. This rewritten code is then maintained on the server and transmitted to clients using conventional techniques. In particular, after processing by the code splitting tool, applications will initially transfer only the portion of code (including some combination of stubs and bodies) that is necessary for initial application execution. Additional stubs and/or bodies are then transferred from the server to the client either on-demand at runtime or in the background while the user is interacting with the application and depending upon available bandwidth or other trigger conditions such as application feature access times, network characteristics, client browser type, and/or client device type.

Furthermore, in various embodiments, the code splitting tool uses various training techniques to enhance code optimization by automatically grouping structural code units into "clusters" roughly corresponding to individual high-level application features based on structural code unit access times or structural code unit call dependencies. This training process involves the use of runtime instrumentation for collecting application data, network performance characteristics, device capabilities, and/or user specific data to form an access profile computed based on structural code unit access times or structural code unit call dependencies. Note that this collected data can represent any desired combination of real world or simulated application transmission, execution, and use conditions. In addition, it should be noted that the training phase may be performed without modifying the deployed Web application, or even without having access to the server hosting the application. In other words, the training phase can use application data collected by directly or indirectly monitoring one or more clients as they interact with the application. This allows for a quick estimate of potential code splitting tool improvements without affecting the existing application deployment.

More specifically, given the training phase, the code splitting tool rewrites the application code in a way that controls clustering of stubs and/or structural code units, which clusters are downloaded to the client, and when those clusters are downloaded to best improve overall application responsiveness from a user perspective. Further, the result of this training-based process is that the code splitting tool is capable of tailoring rewriting of the application code to any combination of specific computing devices (computers, PDA's, cell phones, etc.), specific network conditions, and/or specific users. Consequently, it should be clear that in various embodiments, the code splitting tool is capable of creating a plurality of different versions of the original application. In this case, a specific version of the application is automatically selected for each particular client user depending upon the particular capabilities or characteristics of the client, the computing device being used by the client, and/or the current network conditions over which the client is requesting the application. It should also be noted that re-training, and thus rewriting, of the application code can be repeated at any time desired, such as upon a new application release or if typical user workloads, device capabilities, or network characteristics have changed.

1.1 System Overview:

As noted above, the code splitting tool provides various techniques for automatically analyzing and rewriting code of existing applications to introduce dynamic code loading into those applications. The processes summarized above are illustrated by the general system diagram of FIG. 1. In particular, the system diagram of FIG. 1 illustrates the interrelationships between program modules for implementing various embodiments of the code splitting tool, as described herein. Furthermore, while the system diagram of FIG. 1 illustrates a high-level view of various embodiments of the code splitting tool, FIG. 1 is not intended to provide an exhaustive or complete illustration of every possible embodiment of the code splitting tool as described throughout this document.

In addition, it should be noted that any boxes and interconnections between boxes that are represented by broken or dashed lines in FIG. 1 represent alternate embodiments of the code splitting tool described herein, and that any or all of these alternate embodiments, as described below, may be used in combination with other alternate embodiments that are described throughout this document.

In general, as illustrated by FIG. 1, the processes enabled by the code splitting tool 100 begin operation by receiving a web application 110. This application 110 is then passed to a stubbing module 115 that decomposes the structural code units included in the application into stubs 120 and corresponding bodies 125. A clustering module 130 then clusters groups of the stubs into a plurality clusters, and creates a cluster map 135 that specifies which structural code unit is included in which cluster.

As described in further detail in Section 2.3 and Section 2.4, in various embodiments, the clustering performed by the clustering module 135 is controlled by an "access profile" 140. In general, an access profile 140 is created for groups of one or more clients, for one or more types of devices, and/or for one or more sets of network conditions. Each access profile 140 is created by a training module 145 that receives data regarding client structural code unit access times, device type, and/or network conditions from a network/client evaluation module 150. The network/client evaluation module 150 communicates with one or more clients 105 across a network, such as the Internet or other network (not shown) using conventional network communications protocols.

In embodiments where the access profile 140 is based on communications with the client 105, the client communicates with the code splitting tool 105 via a conventional network communication module 155 that uses conventional network communications protocols. The network communication module 155 passes the web application code received from the server to a conventional browser module 160 that executes the code within a conventional browser-type application (e.g., Internet Explorer®, Firefox®, Safari™ etc.). Further, in various embodiments where the access profile is based on structural code unit access times (structural code unit first-run times only, as described in Section 2.3 and Section 2.4 with respect to the use of functions as an example), an instrumentation module 165 is used to "instrument" the web application 110. The web application 110 is instrumented by including simple instructions with the web application that record structural code unit access times during execution of the web application within the browser-type application on the client 105. The recorded first access times for each structural code unit are then sent from the client 105 to the network/client evaluation module 150 via the network communication module 155.

Further, in various embodiments, a user interface is provided to manually adjust one or more characteristics that are used to determine cluster formation. For example, as discussed in Section 2.4, in various embodiments, clusters are based on a predefined gap threshold, $T_{gap}$, which represents a maximum time between first-run times for structural code units within which structural code units will be considered for the same cluster, and a minimum cluster size threshold $T_{size}$. Adjusting these threshold values, $T_{gap}$ and $T_{size}$, tends to have a significant effect on which structural code units are clustered together and on cluster size. As a result, adjustment of either or both of these threshold values will directly affect the rewriting of the web application 110 since the rewriting of the web application is specifically based on the clustering, as described herein.

Regardless of whether access profiles or adjustments to clustering thresholds are used to control cluster formation, once the clusters have been identified, a code rewriting module 170 rewrites the web application 110 as described in greater detail in Section 2.3 and Section 2.5. In various embodiments, a code optimization module 180 further optimizes the code, as described in further detail in throughout Section 2.

The rewritten web application 175 is then stored for later use (such as, for example, when the client 105 contacts the server for the web application 110. In this case, once the rewritten web application 175 has been created, the server will send the rewritten web application to the client 105 instead of the web application 110. However, since the rewritten web application 175 includes clusters of stubs 120 and bodies 125, a code loader module 185 ensures proper execution of the rewritten web application 175 within the client's browser-type application by controlling when particular clusters of stubs 120 and corresponding bodies 125 are sent to the client 105. As described in further detail throughout Section 2, in various embodiments, the code loader module 185 sends portions of the rewritten web application 175 to the client 105, either on demand at runtime, or in the background for local caching or storage on the client. Note that in various embodiments, this background downloading may be based on available bandwidth, or may be based on other considerations, such as serializing the downloads based on the clusters, then downloading one cluster after the other in order.

2.0 Code Splitting Tool Operational Details:

The above-described program modules are employed for implementing various embodiments of the code splitting tool. As summarized above, the code splitting tool provides various techniques for automatically analyzing and rewriting code of existing applications to introduce dynamic code loading into those applications. The following sections provide a detailed discussion of the operation of various embodiments of the code splitting tool, and of exemplary methods for implementing the program modules described in Section 1 with respect to FIG. 1. In particular, the following sections describe examples and operational details of various embodiments of the code splitting tool, including: an operational overview of the code splitting tool, conventional dynamic code loading; an overview of code evaluation, training and code rewriting; code splitting tool training phase and collection of access profiles; details of code rewriting; background code prefetching; modifying third-party applications; and additional embodiments and considerations.

2.1 Operational Overview:

In general, the code splitting tool acts to automatically analyze and rewrite code of existing applications to introduce dynamic code loading into those applications. More specifically, the code splitting tool automates the process of optimal code decomposition and restructuring. The code splitting tool's processing of application code automatically handles language issues such as closures and scoping; the code splitting tool's analysis discovers an appropriate code decomposition for a likely execution order of structural code units. The result is that that the code splitting tool allows applications to dynamically load the bulk of their code outside of the critical-performance path of initialization, thereby improving initial page loading times and perceived application responsiveness for subsequent application execution.

It should be noted that in the following paragraphs, the term "Web 2.0 application" or the like is generally used to refer to applications executed within a browser type application after being downloaded from a server to a client across a network such as the Internet. However, it should be clear that the code splitting tool described herein is not limited to Web 2.0 applications. Specifically, any web application that is designed to be executed within a browser-type environment can be rewritten by the code splitting tool to provide an improvement in perceived responsiveness, as described herein. Further, it should also be noted that while stubbing and clustering is generally performed with respect to any desired structural code unit (functions, methods, procedures, classes, modules, libraries, variables, data, etc.), the following discussion generally refers to stubbing and clustering of functions for purposes of explanation.

In addition, it should also be noted that the following discussion generally refers to the use of JavaScript™ based applications for purposes of explanation. However, it should be understood that the code splitting tool is capable of processing and rewriting any application code designed to executed within a browser-type application (e.g., applications written in scripting languages such as JavaScript™, etc., or compiled applications written in languages such as C#, C++, Java, etc.). Such languages and applications are well known to those skilled in the art, and will not be described in detail herein.

2.2 Conventional Dynamic Code Loading:

In its most basic form, the client-side component of a typical distributed Web 2.0 application consists of a number of HTML pages that refer to resources such as images, cascading style sheets (CSS), and application code (generally written in scripting languages such as JavaScript™, etc.). The most natural way to transfer application code/script files or other resources such as images or data is by specifying their names directly in HTML. However, this approach causes the Web browser to block until the entire code base is transferred to the client, leading to long pauses in application loading and execution. Before the advent of dynamic HTML, this was the only technique for client-side code loading.

For example, one conventional application uses JavaScript™ to provide multiple-views of maps and satellite photos, driving directions, business search, vector drawing capabilities, advertising, and more. It loads over 200 KB of code compressed, or over 900 KB uncompressed, on the initial page load. In this case, the entire code base is downloaded upfront, thereby delaying initial application execution, especially for slower network connections. However, only a fraction of the downloaded code is executed on the initial page load. Furthermore, code execution takes place in "bursts." Specifically, while the entire JavaScript™ file is available on the client, some functions are automatically executed right away, some are automatically executed at a later time, and other functions are not executed until triggered by some specific user interaction. In addition, in many common usage scenarios, some functions are never executed.

Modern browsers, however, allow for "dynamic code loading," where resources can be fetched on-demand from a server, using a remote procedure call over HTTP. Just like with data, the code in question is fetched as a string and then locally executed by the client. Dynamic code loading enables application architectures in which only a small portion of the code, typically the basic application framework, is initially transferred to the client to initialize the application. The rest of the code is then loaded dynamically at a later point. Despite this support for dynamic code loading in the underlying language and runtime system, building an application that successfully exploits dynamic code loading to improve user-perceived performance is a difficult task.

For example, some applications take advantage of the concept of dynamic code loading by downloading only a small stub of code to the client with the initial page. Such applications then dynamically load the rest of their code in the background. In this case, the applications are designed to implement conventional dynamic code loading at the time they are written. Any changes to these types of applications generally requires manual recoding of the dynamic loading portion of the code to ensure that the application still functions as intended.

2.3 Code Evaluation, Training and Rewriting Overview:

In various embodiments, code splitting tool processing consists of two phases, an optional training phase and an execution phase, as described below.

In the optional training phase, the application is run with its client-side JavaScript™ component instrumented to collect structural code unit-level profile information (such as function access and execution orders and times). Note that this optional training can be applied using as many clients as desired to provide a sufficiently wide statistical base, or to customize code rewriting to specific groups of one or more particular clients. In addition, it should again be noted that the use of JavaScript™ in this example is provided only for purposes of explanation, and is not intended to limit the code splitting tool to operation with a particular scripting or programming language.

The result of this training is an "access profile," that provides a clustering of original functions (or other structural code unit) by time of their first use. For example, in a tested embodiment, training is performed by observing a user performing a fixed workload, although it is possible to train in a distributed manner, by combining workloads from multiple users with varying workloads, resulting in better code coverage and higher quality access profiles.

Access profiles may be either static, determined during initial training, or dynamic, being updated continuously and adjusting to operating conditions during application deployment. In various embodiments, the code splitting tool presents the profile information to the developer so that they can tweak the training parameters and review the resulting clusters.

Further, the training phase can be performed or repeated at any time that it is desired to rewrite the application code. As such, for widely used applications, one or more clients can use instrumented code to collect the structural code unit-level profile information over time. Then, if this data indicates that general usage patterns have changed, the code splitting tool can again rewrite the application code to provide better perceived performance relative to the changed structural code unit-level profile information.

In addition, it should be appreciated that the ability to monitor structural code unit-level profile information for some desired number of users allows the code splitting tool to monitor structural code unit-level profile information for individual users. As such, in various embodiments, the code splitting tool rewrites application code in a way that is specific to the structural code unit-level profile information of individual users (or to groups of users with similar structural code unit-level profile information). In this case, the server will maintain separate versions of the application that are specific to individual users or to groups of similar users.

Further, depending on how the application is executed, different cluster decompositions may make sense. For example, for an application that is deployed on mobile devices (such as cell phones or other devices having wireless connections), small clusters are generally appropriate. In contrast, going to the server to fetch a cluster consisting of only several kilobytes of code is probably wasteful for a Web application running on a desktop computer having a high speed connection to the server.

Once the optional training is completed, the code splitting tool proceeds to statically rewrite existing application JavaScript™ code based on the clusters determined for a given access profile. In the event that the training is not performed, the code splitting tool simply creates fixed size clusters and assigns structural code units to clusters in the order that they are coded in the application. In either case, this cluster-based rewriting splits the existing code base into small "stubs" that are transferred upon connection of the client to the server, with the rest of the code then being transferred either on-demand or in the background using a pre-fetch queue or the like.

For example, assuming a JavaScript™ function $f(x)$, that function is replaced with a "stub" having a simplified version similar to the following pseudo-code:

```
function f (x){
    var real_f_text = blocking_download("f");
    var real_f_func = eval(real_f_text);
    return real_f_func.apply(this, arguments);
}
```

Note that "blocking_download" is a synchronous call that retrieves the body of function $f(x)$ from the server. In other words, each stub provides a stub of the original function (including inputs, outputs, and any necessary variable definitions). Then, if a particular function is actually accessed, either automatically or by some user action, before a background download of the full body of the function has been completed, the server will return the code body for execution by the client. In either case, a network call to the server is made only once per cluster. Specifically, if the body of $f(x)$ has already been transferred to the client either on-demand or via background code loading, blocking_download returns it immediately from a local cache. The function body is then instantiated at runtime and the resulting function is applied to the arguments that are being passed into $f(x)$ via the corresponding stub. Note that processing of the function body is performed using conventional techniques, such as, for example, the "eval" command used to execute JavaScript™.

2.4 Training Phase and Collection of Access Profiles:

As noted above, the training phase, and thus the collection of access profiles, is optional. In general, if access profiles are to be collected, the code splitting tool effectively "instruments" existing code by automatically parsing and instrumenting JavaScript™ code (or code written in some other programming language) and to insert timestamps that allow the code splitting tool to group structural code units into clusters by the time of their first access. This approach allows the code splitting tool to use an instrumentation proxy to obtain timing information for external sites that may not be directly accessible to the code splitting tool. Note that this type of code instrumentation has been used conventionally for other purposes, and as such is well known to those skilled in the art and will not be described in detail herein. In addition, it should be noted that the following discussion generally refers to functions for purposes of explanation rather than structural code units (which as noted above include functions, methods, procedures, classes, modules, libraries, variables, data, etc.).

In particular, the beginning of every function is instrumented to record the timestamp as well as the size of the function. At runtime, timestamps are collected by the instrumentation proxy and post-processed to extract the first-access time $ts_i$ for every function $f_i$ that is observed at runtime. In various embodiments, to avoid excessive network traffic, timestamp data is buffered on the client before being sent to the code splitting tool for use in constructing the access profile.

The list of timestamps is then sorted and evaluated to group functions into clusters, $c_1, \ldots, c_n$. Note that in various embodiments, clusters have a maximum size, $T_{size}$, that is either fixed or variable, and that can be set via a user interface, if desired. For example, assuming a limit on the cluster size, clusters are formed using successive functions (beginning with the function having the earliest timestamp). Formation of the current cluster, $c_j$, is then terminated at function $f_i$ according to the following termination criterion:

$$ts_{i+1} - ts_i > T_{gap} \char`\^ size(c_j) > T_{size}$$

where the time gap, $ts_{i+1} - ts_i$, between two subsequent functions exceeds the predefined gap threshold, $T_{gap}$, and the size, size($c_j$), of the current cluster exceeds the size threshold $T_{size}$. Note that in the clustering process, the code splitting tool disregards the original decomposition of functions into files. In other words, as a result of clustering, functions from different JavaScript™ files comprising the application may and do end up belonging to the same cluster because of temporal proximity to each other based on the timestamps associated with each function.

Further, in a typical training phase, there is no guarantee that every function of the application will be used. For example, if the "help" functionality of an online mapping application is not utilized during the training run, any functions implementing this functionality will not have a timestamp. As such, these unused functions will not be clustered using the timestamp criteria described above. In this case, the unused functions are grouped into a cluster called "⊥". Further, a map, $\mathcal{P}$, is created identify which functions are located within which cluster. Further, in the case of multiple access profiles, as discussed in further detail below, a separate map, $\mathcal{P}_i$ is created for each access profile, as illustrated below:

$$\mathcal{P}, \{f_1, \ldots, f_k\} \to \{c_1, \ldots, c_n, \bot\}$$

In practice, the cluster decomposition changes drastically depending on the threshold values (i.e., $T_{gap}$ and $T_{size}$). In various tested embodiments assuming a user having a high-speed network connection, threshold settings were selected via a user interface to produce on the order of about a dozen clusters that roughly correspond to high-level application activities were used. For example, considering a mapping application, these high-level activities may include the initial page load, double-clicking on the map, moving the map around, asking for directions, printing the map, etc. Each of these high-level activities can be grouped in their own clusters depending upon the threshold settings used.

However, for an application that is likely to run in a mobile setting where the user might be paying for bytes transferred, or where the user may have a slower connection speed, producing a larger number of smaller clusters tends to provide superior performance (often at lower cost) for the user.

As noted above, different versions of the application can be created for different users or groups of users. Similarly, since many applications are often optimized by creating a slightly different version for each browser (e.g., Internet Explorer®, Firefox®, Safari™, etc.) training can be separately performed for each browser, thereby creating different clusters for each browser. Given different clusters, the code splitting tool will inherently create different versions of the application during the automated rewriting process. In this case, the code splitting tool will simply maintain the different versions of the application for each browser. Then, since browsers typically identify themselves to the server, the server will return whatever version is appropriate for the browser making the request.

In further embodiments, the code splitting tool injects a small benchmark utility into the beginning of the application that is used to automatically determine network and CPU conditions for a particular user. Note that this information can be cached on the client for subsequent application runs (or runs of other unrelated applications customized by the code splitting tool). Based on this data, the server can select from one of several applications best suited to the particular conditions of the user (assuming that different versions of the application have been created to cover such operating conditions). Thus, unlike the conventional practice of developing separate "mobile" versions of an application, all versions would be based on the same code.

In addition, it should also be noted that in some cases, it is easier to simulate network conditions expected for particular application scenarios or devices instead of actually testing every possible combination of devices and connections. Consequently, in various embodiments, realistic network conditions were simulated by using a wide-area network simulator that provides control over the effective bandwidth, latency, and packet loss rates of a machine's network connection.

For example, in a tested embodiment, the code splitting tool used the network simulator to simulate three different environments: a Cable/DSL connection with a low-latency network path to a Web site (300 kbps downstream bandwidth and 50 ms roundtrip latency); a Cable/DSL connection with a high-latency network path (300 kbps downstream bandwidth and 300 ms round-trip latency); and a 56 k dial-up connection (50 kbps downstream bandwidth and 300 ms round-trip latency). These various environments were then used to create access profiles that were in turn used to create different versions of the rewritten application, as described in further detail below.

In view of the examples provided above, it should be clear that there is no "perfect" access profile and that to achieve optimal results for particular users, multiple access profiles should be generated based on how the application is likely to be used.

2.5 Code Rewriting:

As noted above, the code splitting tool generally operates by automatically replacing the original JavaScript™ structural code units (or structural code units written in some other programming language) of an application with short stubs. Structural code unit bodies are then retrieved either on demand, or in the background whenever extra bandwidth becomes available. Note that in various embodiments, the structural code units in the first cluster are not stubbed since the first cluster is the cluster most likely to be executed first based on the aforementioned access profile. Therefore, by downloading the first cluster of structural code units, the user can immediately access the portions of the application corresponding to those structural code units. Note that as the following discussion generally refers to the use of functions rather than structural code units for purposes of explanation. However, this discussion of functions should be understood to apply equally to other types of structural code units, as noted above.

In general, the client-side component of a Web 2.0 application consists of a set of JavaScript™ files (or files written in some other scripting or programming language). Note that JavaScript™ code may also be included directly in HTML, but each inline script block is conceptually treated as a separate file. Each JavaScript™ file consists of top-level code that is executed unconditionally and a set of function declarations. Each function declaration in its turn may contain top-level code as well as local function declarations.

The code splitting tool rewrites one or more of these files by first injecting "helper functions" such as blocking_download, etc., that are required for dynamic code loading, background code pre-fetch, and generating stub code on the client. Generally, every function in each file, with the exception of the functions in the first cluster, will be replaced by a stub. However, in various embodiments, for every function in each file, the code splitting tool instead decides whether to transfer it verbatim or to replace it with a stub (again with the exception of the functions in the first cluster). This decision is based on the length of the function. In a tested embodiment, the code splitting tool was set to only rewrite functions that were longer than 50 characters, since shorter functions would be around the same size as the stubs, and as such, there is no need to create a stub for those functions. Pseudo-code for determining whether to stub functions is shown below in Table 1.

TABLE 1

Pseudo-Code for Determining whether to Stub Functions

```
    // read access profile
        {c_1, ... , c_n, ⊥} = read_clusters( );
    // for each JavaScript ™ file ("js")
        foreach ( js ∈ application ) {
            inject code splitting tool helper functions
            // for each function f
            foreach ( f ∈ js ) {
                if ( isLarge(f) && (f ∉ c_1) ) {
                    replace f with stub for f
                } else {
                    transfer f verbatim
                }
            }
        }
```

2.5.1 Client-Side Execution:

Given the rewritten application code, the client-side execution of the rewritten application is affected by the code splitting tool in the following ways:

1. When a new JavaScript file is received from the server on the client, the code splitting tool lets the browser execute it normally. This involves running the top-level code that is contained in the file and expanding stubs that correspond to declaration of top-level functions contained therein, as further explained in Section 2.5.4.
2. When a function stub is hit at runtime:
   a. If the function code has not been downloaded and cached, download and cache the function code using helper function blocking_download. (See also the discussion of the "real_f" text variable in Section 2.3).
   b. If a function instance with the proper function closure has not been created and stored, then apply eval to the cached function code from step a. to create a function instance with the proper closure and store this instance for future use. (See also the discussion of the "real_f" text variable in Section 2.3).
   c. Execute the function instance with the proper function closure by applying the instance to the function arguments and returning the result.
3. When the application has finished its initialization, fetch the next cluster from the server and save/cache the functions and/or stubs contained in it on the client. Note that fetching subsequent clusters can be scheduled using timers developed from the access profile.

2.5.2 Client-Side Execution Example:

The following discussion first illustrates an example of the code rewriting performed by the code splitting tool and then describes implementation details and various corner cases of local functions and function closures. In addition, various optimization embodiments for reducing runtime overhead and the size of the code that needs to be transferred to the client for application execution are also described.

In particular, the following discussion provides an example of how global functions $f_1$ and $f_2$, both belonging to cluster $c_2$, and illustrated in Table 2 are rewritten. Table 3 illustrates an example of how functions $f_1$ and $f_1$ are rewritten. In this example, "$id_1$" and "$id_2$" refer to globally unique identifiers for $f_1$ and $f_1$, respectively.

Note that the following discussion focuses primarily on function $f_1$, function $f_2$ is treated similarly:

1. For each function, the code splitting tool turns its body into a short stub, as shown on lines 1-10 of Table 3. The stub first invokes the guard for the cluster the function belongs to ($c_2$ in this case). This is a blocking action that only returns after the body of the function has been saved in the global associative array "func."
2. Next, the function body is retrieved as text and evaluated using the "eval" construct of JavaScript. Note that the call to eval is performed in the same scope as the original function definition for $f_1$ on line 5 of Table 3. This way, since the body of $f_1$ refers to global variable g, at the time of applying eval, variable g will be resolved properly. This is why the code splitting tool cannot, for example, perform the eval of the original function body within the guard function and return the closure corresponding to the actual code of $f_1$. The result of the eval call is saved in global variable real_µl so that the "if" body is only entered once per function. Note that local functions are handled in a different manner, as discussed in further detail below in Section 2.5.5.
3. Lastly, on line 9 the code splitting tool returns the result of applying the real function body stored in real_f1 to the original set of arguments (variable y in this case) on object "this".

TABLE 2

Example of File having Functions $f_1$ and $f_2$ before Rewriting

```
 1  var g = 10;
 2  function f_1(y) {
 3      var x = g + y;
 4      ...
 5      return ...;
 6  }
 7  function f_2(z) {
 8      ...
 9      return ...;
10  }
```

TABLE 3

Example of Functions after Rewriting by the Code Splitting Tool

```
 1  var real_f1 = null;
 2  function f_1(y){
 3      if(real_f1 == null)
 4          guard_cluster_c2( );
 5      real_f1 = eval(func["id_1"]);
 6      f_1 = real_f1;
 7  }
 8
 9      return real_f1.apply(this, arguments);
10  }
11
12  var real_f2 = null;
13  function f_2(z) {
14      if(real_f2 == null)
15          guard_cluster_c2( );
16      real_f2 = eval(func["id_2"]);
17      f_2 = real_f2;
18  }
19
20      return real_f2.apply(this, arguments);
21  }
22
23  function guard_cluster_c2( ){
24      var xhr = new XmlHttpRequest( );
25      xhr.open("http://code.server.com/cluster=c2",
26          /* synchronous AJAX call */ false);
27      xhr.send(null);
28      var code = xhr.responseText;
29      // split code into function bodies
30      foreach(<func_id, func_code> in code) {
31          func[func_id] = func_code;
32      }
33      // empty closure
34      guard_cluster_c2 = function( ) { };
35  }
```

2.5.3 Runtime Optimizations:

In addition to the code rewriting described above, various embodiments of the code splitting tool perform one or more additional runtime optimizations at the time of rewriting to reduce the runtime overhead experienced by the rewritten code compared to the original code. These optional runtime optimizations are described below:

1. Reassigning Function Value: As an optimization tactic, the code splitting tool assigns the closure returned from eval to $f_1$ on line 6 (see Table 3). This way, the second and any subsequent invocations of $f_1$ will go directly to the original code, thereby completely circumventing the rewritten code. However, things are more complicated in the presence of function aliasing. In particular, if a reference to $f_1$ were obtained prior to $f_1$ being executed, then the guarded version of $f_1$ may still be called through that reference, so it is unsafe to eliminate it completely.
2. Guard Elimination: Before existing, guard_cluster_c2 "eliminates itself" by assigning the empty closure to global variable guard_cluster_c2 on line 34 (see Table 3). This way, the guard body will only be executed once per cluster. For instance, if function $f_2$ is invoked after $f_1$, the guard will be a no-op.
3. Elimination of Blocking Calls: Another optional optimization (not illustrated in the example provided in Table 3) involves eliminating blocking calls to the server by converting the program into a continuation-passing style. In particular, while it is easy to perform an asynchronous server call and to register a callback, the difficulty lies in the fact that the code splitting tool still needs to evaluate the code in the proper lexical scope when it arrives, which is not really possible within the callback. A notable exception is global (or top level) functions, where blocking calls may indeed be eliminated.

2.5.4 Optional Code Size Optimizations:

The function stubs illustrated in the example discussed in the preceding paragraphs (and shown in Table 3) tend to be fairly long. Therefore, in various embodiments, stub size is further reduced by applying a code reduction technique, as described below, that typically reduces the size of a stub from around several hundred characters to around 50 characters or less. For an application having large numbers of functions, such reduction in stub size can significantly reduce the download sizes and times needed for application execution.

In particular, dynamic scripting languages such as JavaScript™ allow function introduction at runtime. As such, it is not necessary to transfer complete stubs over the network as long as complete stubs can be generated on the client from whatever information is sent to the client. Therefore, a type of "shorthand" stub is created by parametizing the text of each stub with its name and argument names, and introducing a helper function, such as "exp(function_name, function_id, argument_names)" to allow the client to locally generate the stub at runtime.

In the example provided in Table 3, the code splitting tool would replace the stubs for function $f_1$ and $f_2$ as well as the guard for cluster $c_2$ with:

eval(exp("$f_1$", "$id_1$", "")); eval(exp("$f_2$", "$id_2$", ""));

Then, since the format of each stub is always the same, and since the client is provided with the helper function to expand each stub into the format shown in Table 3, it is a simple matter to quickly expand each stub on the client. This runtime code generation reduces the download size at the expense of introducing extra runtime overhead for running function "exp" and applying eval to the resulting string.

However, the computational resources needed to expand the stubs are generally so small relative to the typical computing capabilities of the client that any resulting delay in application execution or responsiveness will not be perceived as a delay by the end user. Also note that the stubs of nested functions are introduced at runtime after the body of containing functions have been expanded. In tested embodiments of the code splitting tool, it has been observed that these code size optimization techniques can save hundreds of kilobytes of JavaScript™ for large applications, thereby reducing download sizes, reducing download times, and improving perceived application performance.

In related embodiments, other compression techniques are applied to further reduce code size. Note that these additional compression techniques can be applied in combination with the above described size reduction techniques, or can be applied separately, if desired. For example, as is known to those skilled in the art, one common compression technique used to reduce the size of code such as JavaScript™ is to first parse the code to remove superfluous white space from that code. Generally, some amount of additional white space is added to improve the readability of code for a human reader, but is simply ignored when evaluating that code for execution. Consequently, various embodiments of the code splitting tool include white space removal for code size reduction. Note that whitespace removal does not remove whitespace that is not superfluous, such as, for example, a space between two words that are intended to be displayed to the user.

Another conventional size reduction technique is to use lossless compression, such as a "zip" type compression, to reduce file size. In this case, after code has been rewritten, the various clusters are compressed on the server, such as by using zip or gzip-type compression (or any other lossless compression technique). The compressed code is then transmitted from the server to the client in the same manner as uncompressed code. The client then locally uncompresses the code, and optionally caches the uncompressed code, prior to local execution of that code.

2.5.5 Code Rewriting Considerations:

In some ways, the examples discussed in the preceding sections illustrate a "best case scenario" for the automated code rewriting techniques provided by the code splitting tool. For real-world applications, there are several additional issues that should be addressed when performing function rewriting. For example, unlike many other mainstream languages, scripting languages such as JavaScript™ allow nested function definitions.

Further, local functions complicate the automated rewriting strategy described above. Thus, to address this issue, the code splitting tool caches real function bodies (i.e., "real_f1" and "real_f2" in the examples discussed above) in a local context just before the function definition. Also note that since local declarations may close over variables in the lexical scope, the code splitting tool performs evaluation of real function bodies in the same context as the original function declaration. Clearly, performing an eval in the top-most lexical scope, for example, may create references to undefined variables.

JavaScript™ allows the developer to define function closures, which may be assigned to variables, passed around, and invoked arbitrarily. Unlike regular function definitions, closures are allowed to be anonymous. When rewriting anonymous closures, the code splitting tool traverses up the AST to find an appropriate place for introducing cache variables. Furthermore, the optimization of reassigning the function value does not apply to function closures, which often have multiple aliases within the program.

Note that as is well known to those skilled in the art, an "abstract syntax tree" (AST), or just syntax tree is a finite, labeled, directed tree, where each interior node represents a programming language construct and the children of that node represent meaningful components of the construct. Operators are defined to name these programming language constructs. Internal nodes are labeled by these operators, and the leaf nodes represent the operands of the operators. Thus, the leaf nodes are NULL operators and only represent variables or constants.

Finally, it is important to note that the automated rewriting techniques described herein rely on the abstraction of functions that are entities that may only be created, assigned, or applied. However, if the original program, for instance, chooses to examine the code of a function such as by calling f.toString( ), the stubbing performed by the code splitting tool may produce unexpected results. Fortunately, while such cases are possible, they tend to be uncommon in real-world applications. However, to ensure that applications are not "broken" during the rewriting process, various embodiments of the code splitting tool specifically check for such cases and ensure that any functions containing such code are not stubbed.

2.6 Background Code Prefetching:

Background code prefetching allows the code splitting tool to push code to the client instead of having the client pull code from the server. For example, when translating JavaScript™ files, the code splitting tool injects the prefetch code shown in Table 4 into each HTML file passed to the client. Note that this approach relies on the server maintaining per-client status with respect to the code that has already been transferred over. A viable alternative would be to transfer cluster information to the client so that it would be able to specify to the server which function to fetch. Note that when fetching a cluster it is not necessary to specify the entire cluster: a single structural code unit from it will suffice since the aforementioned mapping, $\mathcal{P}$, is available to determine which cluster contains a specific structural code unit. Again, note that as the following discussion (including Table 4) generally refers to the use of functions rather than structural code units for purposes of explanation. However, this discussion of functions should be understood to apply equally to other types of structural code units, as noted above.

TABLE 4

Pseudo-Code for Background Code Pre-Fetching

```
 1  var xhr = new XmlHttpRequest( );
 2  function next_cluster( ){
 3      xhr.open("http://code.server.com/next",
 4      /* asynchronous AJAX call */ true);
 5
 6      xhr.onreadstatechange = handle_cluster;
 7      xhr.send(null);
 8  }
 9
10  function handle_cluster( ){
11      if (xhr.readyState != 4) { return; }
12          var code = xhr.responseText;
13      if (code == "") return; // last cluster
14
15      // split code into function bodies
16      foreach(<func_name, func_code> in code) {
17          func[func_name] = func_code;
18      }
19
20      // go fetch the next cluster
21      next_cluster( );
22  }
23
24  // initial invocation of next_cluster
```

TABLE 4-continued

Pseudo-Code for Background Code Pre-Fetching

```
25  // after the document is done loading
26  document.attachEvent("onload", next_cluster);
```

Function "next_cluster" (see line 2 of Table 4) requests the next cluster in the access profile that has not yet been transferred over from the server. Function "handle_cluster" (see line 10 of Table 4) is registered as an AJAX callback on line 6 to process the server response to update the global array func with the function bodies it retrieved. As the last step, on line 21 of Table 4, function handle_cluster calls next_cluster again. This way, there is a continuous queue of downloads from the server that is driven by the client. The initial code request is performed by registering an onload handler for the page as shown on line 26 of Table 4. Cluster $\perp$ which contains functions that are never seen as part of runtime training is never automatically returned by the server and is only downloaded on-demand. However, in a related embodiment, in the case that neither bandwidth nor download cost is a consideration, cluster $\perp$ may be automatically sent to the client after all other clusters have already been returned by the server.

Note that the example illustrated above shown only a download of only one cluster at a time. This is because many conventional browsers only allow a total of open two connections per server at a time. Consequently, the code splitting tool avoids using up all the connectivity to a particular just by downloading code. However, other browsers, especially more recent browsers, typically increase the threshold number of available server connections to allow for more simultaneous connections. Therefore, in various embodiments, two or more clusters may be downloaded using multiple simultaneous connections to reduce download times. Other alternatives to the "constant" code pre-fetching shown above include putting fetching the next cluster based on timer events (constructed based on the function access/execution times in the access profile), or detecting periods of user inactivity by intercepting UI events and then downloading the code in the background whenever the user is inactive.

2.7 Modifying Third-Party Applications:

One interesting capability of the code splitting tool includes the ability to rewrite third party applications without having direct control over the server hosting the third party application. In general, in various embodiments, the code splitting tool is implemented as a rewriting proxy that intercepts the responses from third-party Web servers and dynamically rewrites their JavaScript™ (or other scripting language) content using the code splitting techniques described above.

Figure 2:
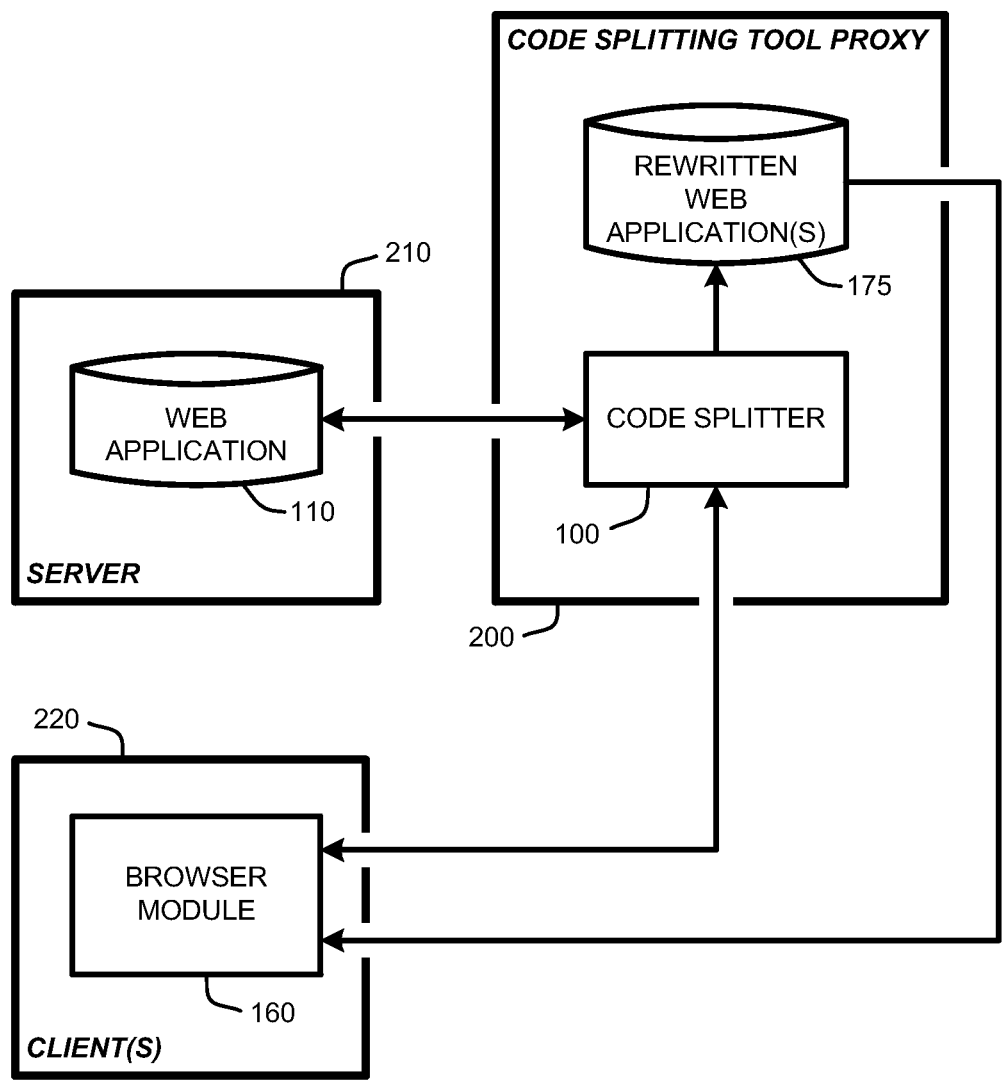
FIG. 2 illustrates an exemplary diagram showing the code splitting tool acting as an intermediary between a client and a server for the purpose of rewriting third party application code, as described herein.

More specifically, in order to rewrite third party applications, one or more client-side Web browsers were chained to the proxy implementation of the code splitting tool as illustrated in FIG. 2. In other words, the code splitting tool was implemented as an intermediary proxy 200 between a server 210 and a client 220 such that the code splitting tool proxy intercepted all calls from the client and forwarded them to the server. In addition, the code splitting tool proxy 200 intercepted all responses from the server 210 to the client 220 and replied to the client as if it were the server. Note that the access profile (see discussion of the aforementioned training phase) of the client 220 (or groups of clients) is collected at the same time that code splitting tool proxy 200 is acting as an intermediary between the client and the server 210.

Further, to accurately simulate a server-side deployment of the code splitting tool with off-line rewriting of application code 110, dynamic rewriting of the application code was not injected into the critical path of serving Web pages. In other words, on a first visit of the client 220 to the server 210, the code splitting tool proxy 200 did not pass rewritten application code 175 to the client, and instead simply passed all traffic between the client and the server while collecting information sufficient for constructing an access profile, as described above.

Thus, in this case, the code splitting tool proxy 200 caches all information received from the server 210 (in addition to forwarding that information to the client 220) and then performs an offline rewriting of the code using the rewriting techniques described above. Then, on the client's 220 second or subsequent "visit" to the web site (i.e., the server 210) hosting the application, the code splitting tool proxy 200 will directly respond to the client with the rewritten application code 175 instead of actually contacting the server on behalf of the client. In other words, the code splitting tool proxy 200 can replace the server for the second and subsequent visits of the client 220 (or the first visit of subsequent clients following the offline rewriting of the application code 110).

However, it should also be noted that the code splitting tool proxy can provide the rewritten code to the server (along with any corresponding access profiles), if desired, so that the server can in turn provide the rewritten code to any clients that subsequently contact the server with a request for the application. In this case, the code splitting tool proxy is essentially providing a code rewriting service to the server.

2.8 Additional Embodiments and Considerations:

The preceding paragraphs describe various embodiments for implementing the code rewriting capabilities of the code splitting tool. However, there are a number of ways in which those capabilities can be further enhanced.

For example, in various embodiments, a static analysis of the code is performed to remove guards. In particular, in Section 2.5, a conservative approach to code rewriting was described in which the code splitting tool assumes that all structural code units need to be guarded, requiring large numbers of guards to be introduced. With some static analysis, however, these guards can be optimized away. For example, considering functions, if the code splitting tool constructs a conventional call graph of the application and builds dominators for the call graph, clusters can be arranged so that a guard for every function $f_1$ dominating $f_2$, guard_f1 fetches the body of $f_2$. The fact that $f_1$ dominates $f_2$ implies that there is no way to invoke $f_2$ without calling $f_1$ first, making this approach sound. With this technique, stubs for many functions would not be transferred at all, unless they become required by a higher-level guard.

Further, as noted above, code splitting can be performed without first performing the training phase for constructing the aforementioned access profile. In this case, various embodiments of the code splitting tool perform a static analysis of the unmodified application code in lieu of the aforementioned runtime training. Again, this static analysis is used to construct an application call graph. This call graph is then used to cluster structural code units, with those clusters then being used, as described above, to automatically rewrite the application code. As such, given an application call graph, the code splitting tool is able to simply eliminate the training phase.

Specifically, given the call graph, the code splitting tool uses trees in the dominator forest as clusters that are then passed to the rewriting stage of the code splitting tool. However, it should be noted that depending upon how a particular application is coded, it may not be amenable to a static analysis that is sufficient for call graph construction. In such cases, it will still be necessary to perform the initial training phase described above.

Finally, it should be clear that once the application code has been written, the code splitting tool can process that code at any time desired in order to rewrite that code as described herein. Therefore, in one embodiment, the functionality of the code splitting tool is integrated into whatever compiler is being used to initially produce the code. Then upon generation of the code, the compiler is directed to rewrite the code as described above. Examples of compilers that are suitable for including integration of the code splitting tool include compilers such as Silverlight®, Volta®, GWT®, etc. Note that integrating the code splitting tool directly into the compiler is advantageous in that such integration not only enables the static analyses described above, it will also make code rewriting part of profile-driven code generation and the development process and the runtime environment instead of a separate deployment-time tool.

Figure 3:
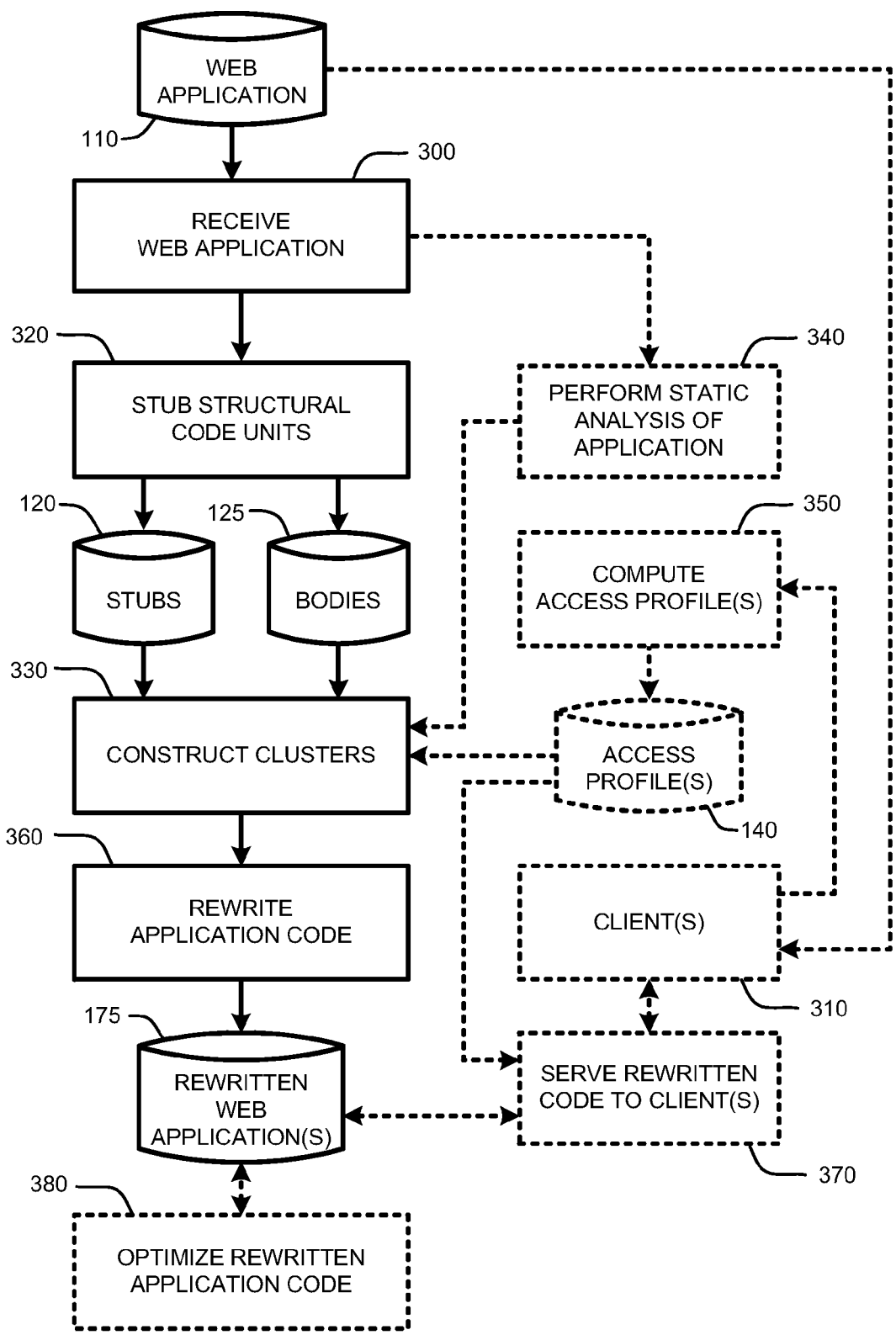
FIG. 3 provides general system flow diagram that illustrates exemplary methods for implementing various embodiments of the code splitting tool, as described herein.

3.0 Operational Summary of the Code Splitting Tool:

The processes described above with respect to FIG. 1 and FIG. 2, and in further view of the detailed description provided above in Section 1 and Section 2 are illustrated by the general operational flow diagram of FIG. 3. In particular, FIG. 3 provides an exemplary operational flow diagram that illustrates operation of some of the various embodiments of the code splitting tool described above. Note that FIG. 3 is not intended to be an exhaustive representation of all of the various embodiments of the code splitting tool described herein, and that the embodiments represented in FIG. 3 are provided only for purposes of explanation.

Further, it should be noted that any boxes and interconnections between boxes that may be represented by broken or dashed lines in FIG. 3 represent optional or alternate embodiments of the code splitting tool described herein, and that any or all of these optional or alternate embodiments, as described below, may be used in combination with other alternate embodiments that are described throughout this document.

In general, as illustrated by FIG. 3, the code splitting tool begins operation by receiving 300 the web application 110. Note that as discussed above, the code splitting tool can act in cooperation with the server (not shown) to both host and rewrite the web application 110, or can act as a proxy or intermediary between the server and a client 310 in order to rewrite third-party applications hosted by the remote server. Consequently, in various embodiments, the code splitting tool will either have direct access to the web application 110, or will capture the web application by acting as a proxy between the client 310 and the server.

In either case, once the code splitting tool has received 300 the web application 110, the code splitting tool evaluates the code of the web application and stubs 320 the structural code units to create stubs 120 and corresponding bodies 125. These stubs 120 and bodies 125 are then used to construct 330 clusters. As described above, in various embodiments, the clusters are based either on a static analysis 340 of the web application 110, or on access profiles 140 that are computed 350 based on various combinations of structural code unit access times, network characteristics, client 310 browser type, and/or client device type.

Then, given the clusters, the function stubs 120, and the function bodies, the code splitting tool rewrites 360 the application code. In embodiments where access profiles 140 are used, the code splitting tool will rewrite 360 a different version of the web application 110 for each unique access profile (since rewriting of the web application specifically depends on the clustering of structural code units). The rewritten web application 175 is then stored for later use. As discussed above, this later use includes serving 370 rewritten web application 175 to the client 310, or presenting the rewritten web application to a remote server (in the case where the code splitting tool acts as a proxy).

In addition, in various embodiments, the rewritten web application 175 is optimized 380 using various optimization techniques to reduce file size, as described above.

Figure 4:
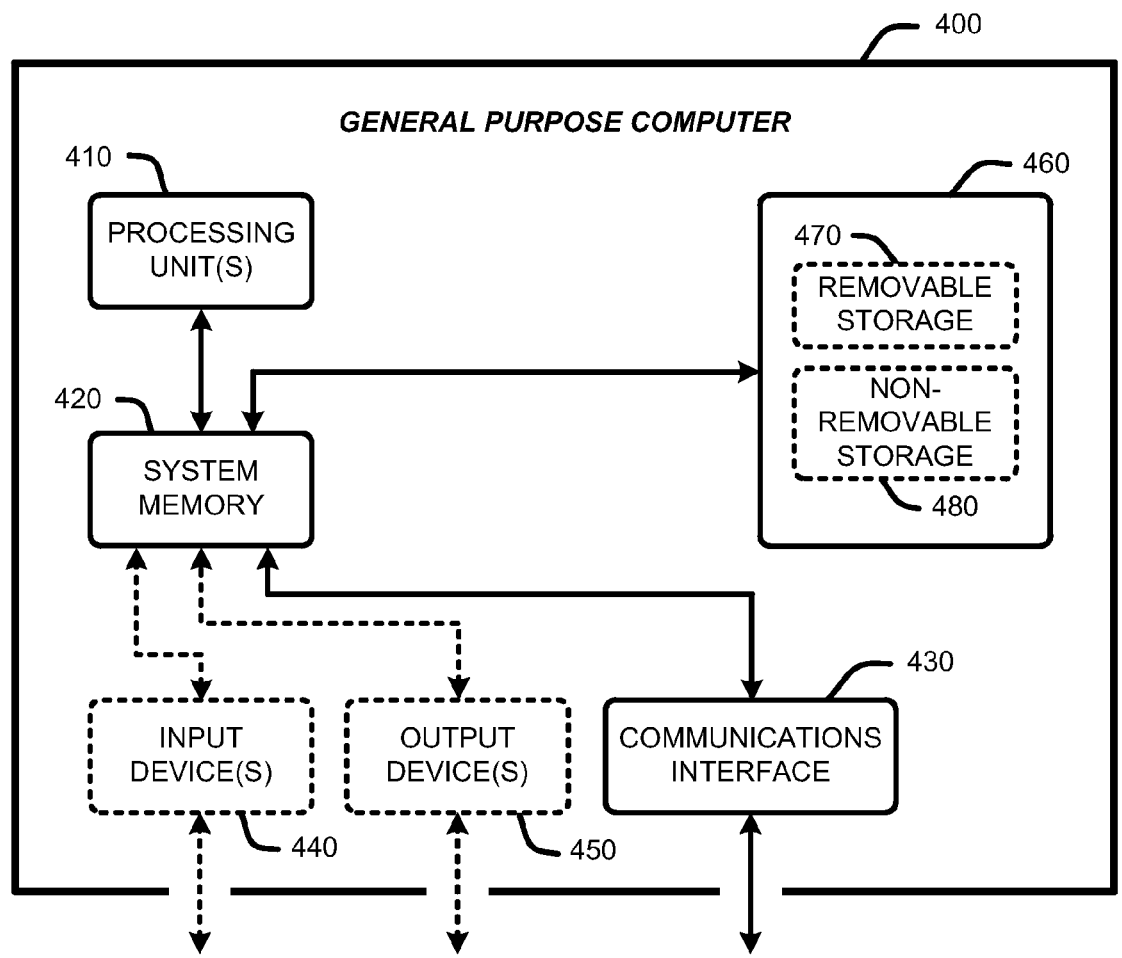
FIG. 4 is a general system diagram depicting a simplified general-purpose computing device having simplified computing and I/O capabilities for use in implementing various embodiments of the code splitting tool, as described herein.

4.0 Exemplary Operating Environments:

The code splitting tool is operational within numerous types of general purpose or special purpose computing system environments or configurations. FIG. 4 illustrates a simplified example of a general-purpose computer system on which various embodiments and elements of the code splitting tool, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

At a minimum, to allow a device to implement the code splitting tool, the device must have some minimum computational capability along with a network connection. In particular, as illustrated by FIG. 4, the computational capability is generally illustrated by one or more processing unit(s) 410, and may also include one or more GPUs 415. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440. The simplified computing device of FIG. 4 may also include other optional components, such as, for example, one or more conventional computer output devices 450. Finally, the simplified computing device of FIG. 4 may also include storage 460 that is either removable 470 and/or non-removable 480. Note that typical communications interfaces 430, input devices 440, output devices 450, and storage devices 460 for general-purpose computers are well known to those skilled in the art, and will not be described in detail herein.

The foregoing description of the code splitting tool has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the code splitting tool. It is intended that the scope of the invention be limited not by this detailed description, but rather by the claims appended hereto.

What is claimed is:

1. A method for automatically rewriting a web application to improve perceived application performance, comprising steps for:
    receiving a web application that is designed to be executed within a browser-type application on a client computing device (i.e., the client);
    decomposing structural code units of the web application into a set of stubs and a set of corresponding bodies;
    determining a clustering of structural code units within the web application, said clustering being based, in part, on an identification of first execution times for each structural code unit, each first execution time representing a particular point in time corresponding to a first-access time that is observed at runtime for each particular structural code unit;
    constructing a new application by rewriting the web application based on the clustering, wherein stubs are used to replace corresponding structural code units in the application to reduce a total size of code that that must be transferred to the client;
    wherein each stub retrieves the corresponding body to the client when the stub is executed within the browser-type application on the client; and
    wherein the retrieved corresponding body is then used to enable client-side execution of the corresponding body.

2. The method of claim 1 wherein determining the clustering of stubs further includes:
    constructing a separate access profile for one or more unique groups of one or more clients; and
    wherein each access profile is used to determine which structural code units are sufficiently related to require those structural code units to be downloaded as a single cluster from a server hosting the new application to the clients in the unique group, said sufficiently related structural code units being used to determine the clustering.

3. The method of claim 2 wherein determining which structural code units are sufficiently related further includes performing a runtime analysis to identify the first execution times for each structural code unit of the web application within the browser-type application of each client in each unique group.

4. The method of claim 2 wherein determining which structural code units are sufficiently related further includes evaluating network characteristics for communications between a server hosting the web application and the clients in each unique group.

5. The method of claim 2 further comprising periodically reconstructing one or more of the separate access profiles for use in determining the clustering.

6. The method of claim 1 wherein any structural code units needed for initial execution of the web application are not decomposed into stubs and bodies, and are instead included as a first portion of the new application along with the stubs which are included as subsequent portions of the new application.

7. The method of claim 6 further including providing the new application to the client in place of the web application, and wherein providing the new application to the client further includes:
    downloading the first portion of the new application to the client;
    automatically scheduling and background downloading one or more of the subsequent portions of the new program to the client, said background downloads being scheduled based on available bandwidth between the server and the client; and automatically scheduling downloading the bodies to the client on either of being called by a corresponding stub and as a background download prior to being called by the corresponding stub, said background downloads being automatically scheduled based on one or more predetermined trigger conditions.

8. The method of claim 1 wherein the web application is maintained by a third-party server, wherein:

the web application is received by inserting a proxy between the third-party server and the client to capture and relay communications from the third-party server to the client; and once the new application constructed, the new application is maintained by the proxy so that calls to the web application from the client are replaced by the proxy with the new application without contacting the third-party server.

9. A system for automatically decomposing and rewriting a web application for execution within a browser-type application, comprising:

a device for receiving a web application;

a device for learning a unique access profile for each of a plurality of unique groups of one or more clients, each access profile including an identification of first execution times for each structural code unit of the web application within the browser-type application of each client in each unique group;

each first execution time representing a particular point in time corresponding to a first-access time that is observed at runtime for each particular structural code unit;

a device for decomposing the web application to generate a set of stubs and a set of corresponding bodies for structural code units, wherein each stub is designed to call its corresponding body for retrieval by the client when the stub is executed by the client, and wherein the retrieved corresponding body is then used to enable client-side execution of the corresponding body;

a device for generating a corresponding clustering of stubs from each unique access profile; and a device for constructing a separate new application for each unique access profile by rewriting the web application based on the corresponding clustering of stubs associated with each access profile to reduce a total size of code that that must be transferred to the client prior to initial execution of the new application.

10. The system of claim 9 wherein rewriting the web application based on the corresponding clustering of stubs associated with each access profile further includes using the clusters of stubs to replace corresponding structural code units in the web application.

11. The system of claim 9 wherein learning a unique access profile for each of the plurality of unique groups of one or more clients further includes automatically injecting an application instrumentation utility into the web application to perform a runtime analysis of user interaction with the web application to identify the first execution times for each structural code unit.

12. The system of claim 9 further including providing one of the new applications to the client in place of the web application when the client directs the browser application to a website hosting the web application.

13. The system of claim 9 wherein any structural code units needed for initial execution of the web application are not decomposed into stubs and bodies, and are instead included as a first portion of each separate new application along with the clusters of stubs which are included as subsequent portions of each separate new application.

14. The system of claim 13 further comprising providing one of the new applications to the client by:

downloading the first portion of the new application to the client as soon as the client directs the browser application to a website hosting the web application;

automatically scheduling and background downloading one or more of the subsequent portions of the new program to the client, said background downloading being scheduled based on available bandwidth between a server hosting the website and the client; and automatically scheduling downloading of the bodies to the client on either of being called by a corresponding stub and as a background download prior to being called by the corresponding stub.

15. A computer-implemented process, comprising:

applying a computer to perform process actions for:

receiving a web application, said web application designed to be delivered from a server to a client for execution within a browser application running on the client when the client directs the browser application to a website hosted by the server, said website including the web application;

performing an automated training phase to construct a unique access profile for each of a plurality of unique groups of one or more clients, each access profile including an identification of first execution times for each structural code unit of the web application within the browser-type application of one or more of the clients in each unique group;

each first execution time representing a particular point in time corresponding to a first-access time that is observed at runtime for each particular structural code unit;

generating a set of stubs and a set of corresponding bodies for each structural code unit comprising the web application;

processing each unique access profile to identify clustering parameters for generating a corresponding clustering of stubs from each unique access profile;

constructing a separate new application for each unique access profile by rewriting the web application based on the corresponding clustering of stubs associated with each unique access profile; and wherein each stub is designed to retrieve its corresponding body from the server when the stub is executed by the client, and wherein the retrieved corresponding body is then used to enable client-side execution of the retrieved corresponding body.

16. The computer-implemented process of claim 15 wherein stub descriptions are generated by the server and then used by the client to locally generate the stubs.

17. The computer-implemented process of claim 15 wherein the web application is maintained by a third-party server, wherein:

receiving a web application further includes inserting a proxy between the third-party server and at least one client to capture and relay communications from the third-party server to the at least one client; and providing at least one of the new applications to the proxy so that when calls to the web application are made by one or more of the clients, the proxy provides one of the new applications to the client without contacting the third-party server for the web application.

18. The computer-implemented process of claim 15 wherein any structural code units needed for initial execution of the web application are not decomposed into stubs and bodies, and are instead included as a first portion of each separate new application along with the clusters of stubs which are included as subsequent portions of each separate new application.

19. The computer-implemented process of claim 18 further comprising providing one of the new applications to the client by:
   downloading the first portion of the new application to the client as soon as the client directs the browser application to the website hosting the web application;
   automatically scheduling and background downloading one or more of the subsequent portions of the new program to the client, said background downloading being scheduled based on available bandwidth between the server hosting the website and the client or other similar trigger condition; and
   automatically scheduling downloading of the bodies to the client on either of being called by a corresponding stub and as a background download prior to being called by the corresponding stub, said background downloading being scheduled based on available bandwidth between the server and the client.

20. The computer-implemented process of claim 15 wherein performing the automated training phase for identification of first execution times for each structural code unit further includes automatically injecting an application instrumentation utility into the web application to perform a runtime analysis of user interaction with the web application to identify the first execution times for each structural code unit.

* * * * *